(12) United States Patent
Rotzoll

(10) Patent No.: US 10,468,993 B2
(45) Date of Patent: Nov. 5, 2019

(54) INVERTER FOR USE IN PHOTOVOLTAIC MODULE

(75) Inventor: Robert R. Rotzoll, Cascade, CO (US)

(73) Assignee: Enphase Energy, Inc., Petaluma, CA (US)

( * ) Notice: Subject to any disclaimer, the term of this patent is extended or adjusted under 35 U.S.C. 154(b) by 1980 days.

(21) Appl. No.: 12/121,580

(22) Filed: May 15, 2008

(65) Prior Publication Data

US 2008/0285317 A1 Nov. 20, 2008

Related U.S. Application Data

(60) Provisional application No. 60/938,663, filed on May 17, 2007.

(51) Int. Cl.
*H02M 5/45* (2006.01)
*H02M 7/00* (2006.01)
(Continued)

(52) U.S. Cl.
CPC ........... *H02M 7/003* (2013.01); *H02M 7/493* (2013.01); *H02S 40/32* (2014.12); *H02J 3/383* (2013.01); *Y02B 10/14* (2013.01); *Y02E 10/563* (2013.01)

(58) Field of Classification Search
USPC ............. 363/63, 65, 74, 78, 79, 80, 97, 131; 323/266, 906; 340/538
See application file for complete search history.

(56) References Cited

U.S. PATENT DOCUMENTS 4,736,151 A * 4/1988 Dishner ................. 323/224
5,227,762 A * 7/1993 Guidette et al. ........... 340/12.34
(Continued)

FOREIGN PATENT DOCUMENTS

| DE | 198 59 732 A1 | 6/2000 |
|---|---|---|
| DE | 19859732 A1 | 6/2000 |

(Continued)

OTHER PUBLICATIONS

International Search report for PCT/US2008/063958, dated, Jan. 19, 2009, pp. 13.

(Continued)

*Primary Examiner* — Fred E Finch, III
*Assistant Examiner* — Nusrat Quddus
(74) *Attorney, Agent, or Firm* — Moser Taboada

(57) ABSTRACT

A photovoltaic module-mounted AC inverter circuit uses one or more integrated circuits, several power transistors configured as switches, several solid-dielectric capacitors for filtering and energy storage, several inductors for power conversion and ancillary components to support the above elements in operation. The integrated circuit includes all monitoring, control and communications circuitry needed to operate the inverter. The integrated circuit controls the activity of pulse-width modulated power handling transistors in both an input boost converter and a single-phase or multi-phase output buck converter. The integrated circuit also monitors all power processing voltages and currents of the inverter and can take appropriate action to limit power dissipation in the inverter, maximize the available power from the associated PV module and shut down the inverter output if the grid conditions so warrant. The integrated circuit implements power line communications by monitoring the AC wiring for signals and generating communications signals via the same pulse-width modulation system used to generate the AC power. Communications is used to report inverter and PV module status information, local identification code and to allow for remote control of inverter operation.

20 Claims, 13 Drawing Sheets

(51) Int. Cl.
  *H02M 7/493* (2007.01)
  *H02S 40/32* (2014.01)
  *H02J 3/38* (2006.01)

(56) References Cited

U.S. PATENT DOCUMENTS

| | | | |
|---|---|---|---|
| 5,592,074 A * | 1/1997 | Takehara | 363/131 |
| 5,625,539 A * | 4/1997 | Nakata | H02M 7/4807 |
| | | | 363/132 |
| 5,689,230 A * | 11/1997 | Merwin et al. | 340/12.33 |
| 5,719,758 A * | 2/1998 | Nakata | G05F 1/67 |
| | | | 323/906 |
| 5,951,785 A | 9/1999 | Uchihashi | |
| 6,134,130 A * | 10/2000 | Connell et al. | 363/89 |
| 6,278,245 B1 * | 8/2001 | Li et al. | 315/307 |
| 6,362,540 B1 * | 3/2002 | Hill | 307/52 |
| 6,384,580 B1 | 5/2002 | Ochoa et al. | |
| 6,404,655 B1 * | 6/2002 | Welches | H02M 7/53875 |
| | | | 363/17 |
| 6,465,993 B1 | 10/2002 | Clarkin et al. | |
| 6,587,051 B2 * | 7/2003 | Takehara et al. | 340/635 |
| 6,809,942 B2 * | 10/2004 | Madenokouji et al. | 363/98 |
| 6,940,187 B2 * | 9/2005 | Escobar et al. | 307/64 |
| 6,987,444 B2 | 1/2006 | Bub et al. | |
| 7,378,757 B2 * | 5/2008 | Nakata | H02J 7/35 |
| | | | 307/71 |
| 7,521,914 B2 * | 4/2009 | Dickerson et al. | 323/288 |
| 7,808,125 B1 * | 10/2010 | Sachdeva | H02M 7/49 |
| | | | 307/30 |
| 8,625,315 B2 * | 1/2014 | Erdman | H02M 7/53875 |
| | | | 363/41 |
| 2002/0145886 A1 * | 10/2002 | Stevens | H02M 7/529 |
| | | | 363/16 |
| 2003/0111103 A1 | 6/2003 | Bower et al. | |
| 2004/0024494 A1 | 5/2004 | Julian | |
| 2004/0174720 A1 * | 9/2004 | Kurokami | H02M 7/53871 |
| | | | 363/16 |
| 2005/0110454 A1 * | 5/2005 | Tsai et al. | 320/101 |
| 2005/0116671 A1 | 6/2005 | Minami et al. | |
| 2005/0117375 A1 * | 6/2005 | Xu | H02J 3/18 |
| | | | 363/95 |
| 2005/0172995 A1 | 8/2005 | Rohrig et al. | |
| 2005/0270000 A1 * | 12/2005 | Chang | H02M 7/48 |
| | | | 323/222 |
| 2006/0146504 A1 | 7/2006 | Belson et al. | |
| 2006/0255786 A1 * | 11/2006 | Schwenkel et al. | 323/284 |
| 2006/0284728 A1 | 12/2006 | Rubinstein et al. | |
| 2007/0252716 A1 | 1/2007 | Burger | |
| 2007/0103108 A1 * | 5/2007 | Capp et al. | 320/101 |
| 2007/0135970 A1 | 6/2007 | Zhou et al. | |
| 2008/0097655 A1 | 4/2008 | Hadar et al. | |
| 2008/0238195 A1 | 10/2008 | Shaver et al. | |
| 2009/0058334 A1 * | 3/2009 | Yamamoto | H02P 21/0039 |
| | | | 318/400.02 |
| 2009/0196082 A1 * | 8/2009 | Mazumder | H02M 5/458 |
| | | | 363/132 |
| 2010/0106339 A1 | 4/2010 | Little et al. | |

FOREIGN PATENT DOCUMENTS

| | | |
|---|---|---|
| DE | 19859732 A1 | 6/2000 |
| JP | 09135571 A | 5/1997 |
| JP | 10150778 A2 | 6/1998 |
| JP | 10-201105 A2 | 7/1998 |
| JP | 10201105 A | 7/1998 |
| JP | H10201105 A | 7/1998 |
| JP | 2000-166097 A2 | 6/2000 |
| JP | H09135571 A | 6/2000 |
| JP | 2000-307144 A2 | 11/2000 |
| JP | 2000350385 A2 | 12/2000 |
| JP | 2001309561 A2 | 11/2001 |
| JP | 2003153549 A2 | 5/2003 |
| JP | 2003-284355 A2 | 10/2003 |
| JP | 2006158001 A2 | 6/2006 |
| JP | 2007043565 A | 2/2007 |
| WO | WO 9750165 A1 | 12/1997 |
| WO | WO-0205449 A1 | 1/2002 |
| WO | WO 03/061260 A1 | 7/2003 |
| WO | WO-03061260 A1 | 7/2003 |
| WO | WO-03098703 A2 | 11/2003 |
| WO | 2004/006342 A1 | 1/2004 |
| WO | 2005117136 A | 12/2005 |

OTHER PUBLICATIONS

International Search report for PCT/US2008/063965, dated, Dec. 23, 2008, pp. 30.
International Preliminary Report on Patentability dated Nov. 26, 2009 for Application No. PCT/US2008/063958.
European Examination Report dated Mar. 10, 2017 for Application No. 08769498.0.

* cited by examiner

INVERTER FOR USE IN PHOTOVOLTAIC MODULE

RELATED APPLICATION

The present application relates to and claims the benefit of priority to U.S. Provisional Patent Application No. 60/938,663 filed May 17, 2007, which is hereby incorporated by reference in its entirety for all purposes as if fully set forth herein. The present application is further related to co-pending U.S. Patent Application Ser. No. LAR004 entitled, "Photovoltaic AC Inverter Mount and Interconnect" and U.S. Patent Application Ser. No. LAR002 entitled "Distributed Inverter and Intelligent Gateway", both of which are hereby incorporated by this reference in their entirety.

BACKGROUND OF THE INVENTION

1. Field of the Invention

The invention relates to direct current to alternating current power conversion and, more particularly, to photovoltaic module output power conversion to alternating current.

2. Description of the Related Art

An inverter is a device that performs direct current (DC) to alternating current (AC) power conversion. FIG. 1 shows a functional diagram of a prior art inverter 101 implementing the power conversion process, which is described in further detail below.

Inverters can be designed to supply power from photovoltaic (PV) modules to the utility power grid, otherwise simply known as the grid. The process of supplying power to the grid places several special constraints on the power conversion process. First, there exists an optimum voltage across the PV module terminals at which maximum power is to be extracted. This is denoted as the maximum power point and it is found via various measurements and computational algorithms. Second, the utility power grid signal appears as a voltage source with low impedance. The best drive signal from the inverter into the utility power grid is a current. Third, the inverter AC output current must be synchronous with the utility power grid voltage. If it is not synchronous, a non-unity power factor may exist resulting in the transfer of undesirable reactive power or, in an extreme case, no power is efficiently transferred from the inverter into the utility power grid due to a significant frequency or phase difference. Fourth, the inverter must monitor the utility power grid and, if there is a failure of the grid supply, prevent any current flow from the inverter into the grid. Grid failure may be due to a break in the grid wiring to the inverter site. Under this condition, if the inverter drives the grid, the remaining portion of the grid connected to the inverter is energized. Since a limited region of the disconnected grid is now energized, it becomes an island of power relative to the dimensions of the grid. Prevention of the island condition by the inverter grid detection mechanism is known as anti-islanding. Anti-islanding is important in that utility workers can be exposed to the hazard of undesired power in an island and have no means to reliably determine if an island exists or disable the power entering the island, particularly if the grid problem is physically distant from the inverter driving the grid.

Existing photovoltaic inverters generally fall into the category of centralized inverters. The centralized inverter accumulates DC power from multiple PV modules wired in series or series combined with parallel connections to achieve a significant total power. This power is converted to AC within the centralized inverter and is connected to the grid. The expected benefit of this method is that the high DC voltage of a series connected string of PV modules allows for greater efficiency in power conversion. Another benefit is that control and monitoring of the system is also centralized.

There is also a category of distributed inverters in which multiple inverters are used to generate the desired AC power from a number of PV modules. In an extreme case, one inverter can be assigned to convert power from one PV module. If the inverter is mounted on the PV module, the assembly comprising the PV module and inverter is termed an AC module. AC modules are generally connected in parallel as opposed to the series connection typically seen for multiple DC connected PV modules used with a centralized inverter.

The benefits of AC modules are multi-fold. First, if an inverter or PV module fails, all other modules can still provide their full power capacity resulting in minimal impact on the total power produced by a PV system. Second, effects of shading or other means that cause one PV module to operate at reduced current does not affect the operation of other modules. In a centralized system, the series connection means that the PV module with the lowest output current limits the entire string of PV modules to this current, regardless of illumination conditions resulting in an overall loss of power on the order of 10 to 30 percent under typical conditions. Third, the inverter in the AC module is capable of measuring the power output of its associated PV module and, via communications means, can report this data to external devices. Centralized inverter systems require an additional, relatively expensive, sensing and communications system to be mounted at each PV module to be able to monitor the performance of individual PV modules. Other advantages have been documented in the prior art.

Previous attempts at development and marketing of AC modules have met with little or no success. The primary reason has been that the sales volume was too low to achieve any kind of economy of scale. The components used in the associated inverters were off-the-shelf, and in many cases were not optimum for the application. The inverter lifetime was limited by many of these components, especially the electrolytic capacitors used for energy storage. The reliability levels of existing off-the-shelf components used in the inverters has limited their lifetime to between five and ten years.

What is desired, therefore, is a circuit that uses a minimum number of components, uses no limited-reliability components and has been optimized for large-scale manufacturing. Such a device would simultaneously achieve economy of scale to support the rapid adoption of solar power via PV modules and can remain in operation for a period of time consistent with other structural electrical power systems.

SUMMARY OF THE INVENTION

According to the present invention, a PV module-mounted AC inverter circuit uses one or more integrated circuits, several power transistors configured as switches, several solid-dielectric capacitors for filtering and energy storage, several inductors for power conversion and ancillary components to support the above elements in operation.

The integrated circuit is developed to include all monitoring, control and communications circuitry needed to operate the inverter. In particular, it controls the activity of pulse-width modulated power handling transistors in both an input boost converter and a single-phase or multi-phase output buck converter. A high voltage bus connects the two converters and has charge storage capacitors to maintain the high voltage output of the boost converter. The integrated circuit also monitors all power processing voltages and currents of the inverter and can take appropriate action to limit power dissipation in the inverter, maximize the available power from the associated PV module and shut down the inverter output if the grid conditions so warrant. The integrated circuit implements power line communications by monitoring the AC wiring for signals and generating communications signals via the same pulse-width modulation system used to generate the AC power. Communications is used to report inverter and PV module status information, local identification code and to allow for remote control of inverter operation.

A single-inductor, grounded-input, bipolar-output boost converter is used to convert the relatively low voltage of the PV module to a higher voltage suitable to drive the output buck converter. The boost converter has two operating modes allowing for optimization of the inverter system design.

A method of parallel connecting two single-inductor, bipolar-output boost converters can also be used to reduce the current requirements of the inductors, transistor switches and diodes of a single boost converter while maintaining the same output power as for the single boost converter. The two converters operate in quadrature phase so that neither inductor is simultaneously discharged. A further benefit of this connection is an increase in ripple frequency present at the boost converter inputs and outputs that allows for a reduction in ripple filtering capacitor value, size and cost. More boost converters can be connected in parallel resulting in further overall improvements.

A method of utilizing delta-sigma modulation in generating the pulse-width modulated drive to the power transistors is given. A standard digital pulse-width modulator with low clock frequency and commensurately low timing resolution is used. A delta-sigma modulator is then used to dither the pulse width up or down by a single clock cycle on a pulse-by-pulse basis. The spectral shaping of the delta-sigma modulation then improves the low frequency resolution of the pulse-width modulated (PWM) system such that a much higher averaged equivalent pulse-width resolution, easily up to millions of times improved, is possible without increasing the PWM clock or PWM output frequency.

A method of input and output current measurement for the input boost converter utilizing the inductor voltage and timing signals is given. The inductor voltage is measured and converted to an equivalent digital value via an analog-to-digital converter (ADC). The single-inductor boost converter switch pulse widths are multiplied by the inductor voltage, averaged over a full inductor switching cycle period and divided by the known inductance to calculate the input current. The time the switches are disabled is multiplied by the inductor voltage, averaged over a full inductor switching cycle period and divided by the known inductance to calculate the output current.

A method for output current measurement for the output buck converter utilizing the inductor voltage is given. The inductor voltage is measured and converted to an equivalent digital value via an ADC. The digital value is passed through a low-pass digital filter to extract a short-term average sufficiently fast to allow for precise current amplitude and phase measurement at the power line frequency. The resulting digital value is divided by the known inductor DC resistance to determine the value of current at the AC output of the inverter. This process is performed for each output phase of a multi-phase output inverter.

DESCRIPTION OF THE DRAWINGS

The present invention is illustrated by way of example and not by limitation in the accompanying figures in which like reference numerals indicate similar elements and in which.

DETAILED DESCRIPTION

Figure 1:
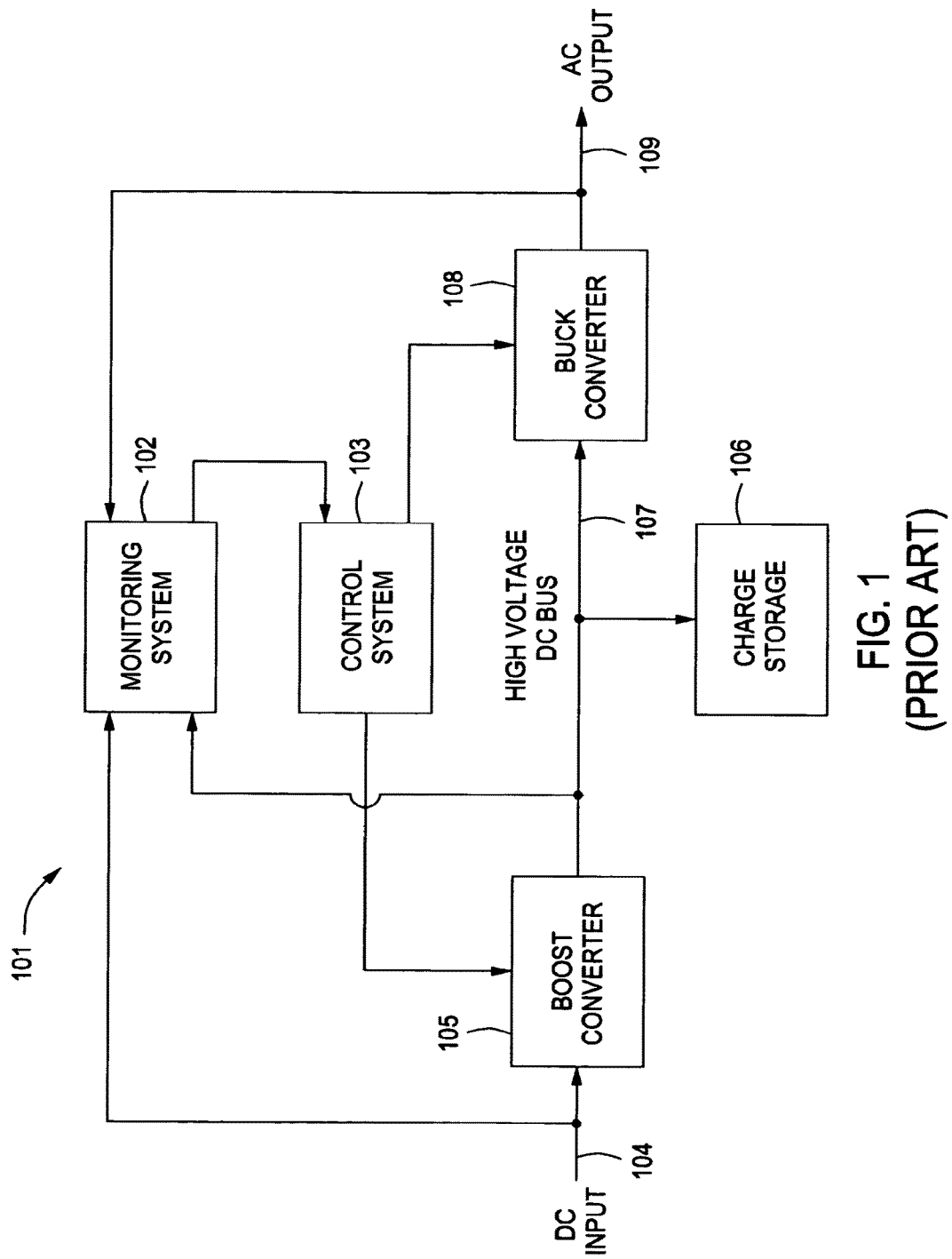
FIG. 1 is a block diagram of a prior art PV inverter including a boost converter, high voltage DC bus, charge storage, buck converter, monitoring system and control system.

Referring now to FIG. 1, a PV module-mounted inverter block diagram 101 according to the prior art includes a DC input 104 for receiving direct current power from a PV module. The current is converted from the DC input 104 to a higher voltage by the boost converter 105 to drive the high voltage DC bus 107. The generated voltage is maintained on the high voltage DC bus 107 by charge storage capacitors 106. The high voltage is converted to an AC output 109 by buck converter 108. The AC signal is compatible in frequency and phase to the AC load signal provided at AC output 109. Monitoring system 102 detects the relevant input voltage and current at DC input 104, the voltage at the high voltage DC bus 107 and the output voltage and current at AC output 109. The detected signals are converted by monitoring system 102 into a suitable format for processing by control system 103. Control system 103 generates appropriate signals to operate and control the boost converter 105 and buck converter 108. A first capability of the monitoring system 102 is to determine the required DC input 104 voltage to extract maximum power from the associated PV module. A second capability of monitoring system 102 is to detect the voltage and frequency of the signal at AC output 109 to determine if the AC output voltage and frequency are within predetermined limits of operation for the inverter. If the limits are exceeded, the buck converter 108 is disabled by the control system. A third capability of the monitoring system is to compare the phase of the AC output voltage to the AC output current at AC output 109. The phase must be maintained to cause power to flow out of the AC output 109 with a power factor substantially close to unity. A first capability of control system 103 is to generate timing signals to cause boost converter 105 to convert the low DC input 104 voltage to the high voltage at high voltage DC bus 107. A second capability of control system 103 is to generate timing signals to cause buck converter 108 to convert the high voltage at high voltage DC bus 107 to an AC output current at AC output 109. The prior art PV panel-mounted inverter 101 does not report data directly to any other system. The prior art PV module-mounted inverter 101 utilizes between 200 and 1000 standard components to perform its functions. The large number of components requires a large dimension for the enclosure of the inverter and significantly reduces the reliability and maximum lifetime of the device.

Figure 2:
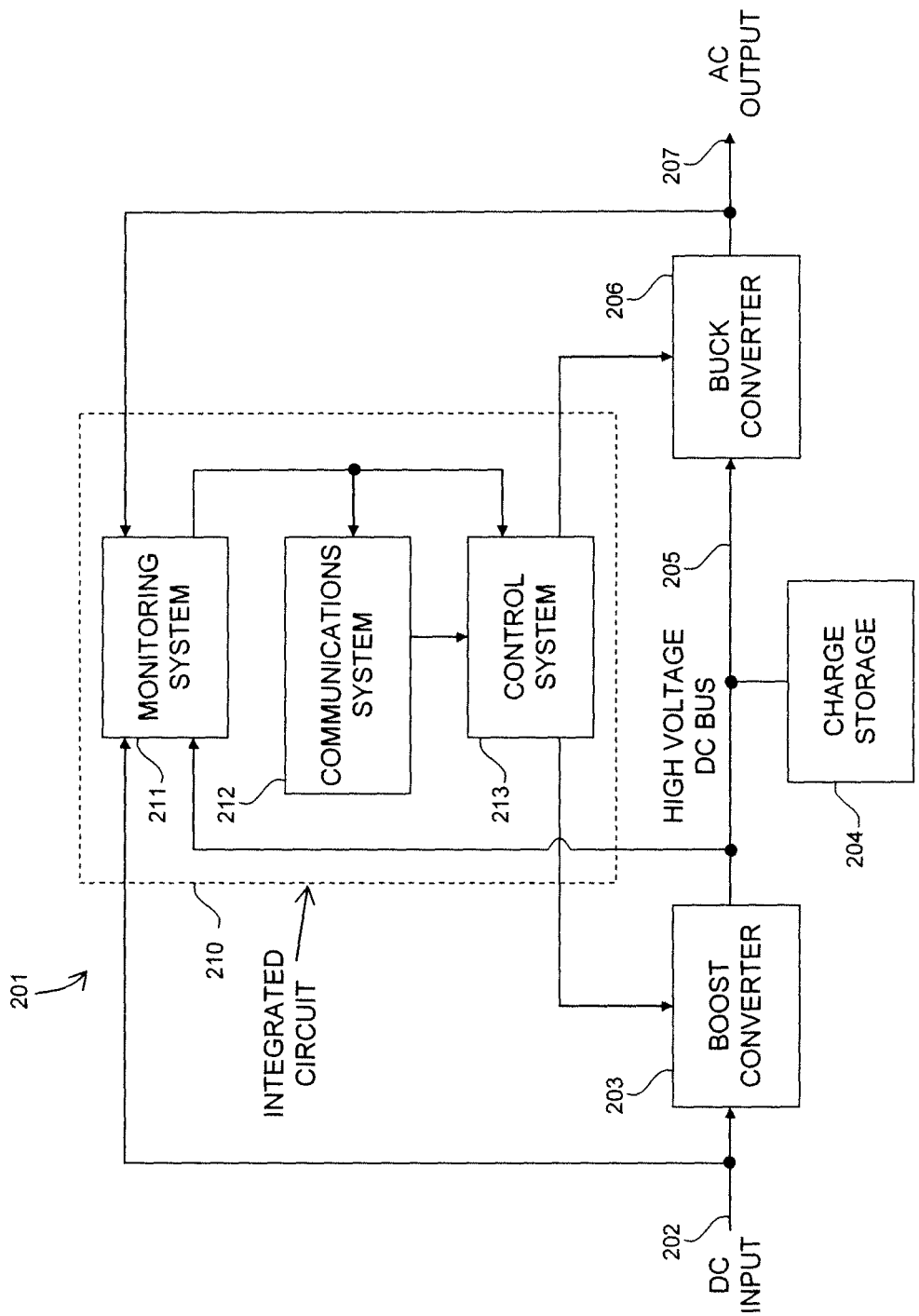
FIG. 2 is a block diagram of the present invention PV inverter including a boost converter, high voltage DC bus, charge storage, buck converter and an integrated circuit comprising a monitoring system, control system and communications system.

Referring now to FIG. 2, a PV module-mounted inverter block diagram 201 according to the preferred embodiment of the present invention includes a DC input 202 and a boost converter 203 to convert the DC input 202 voltage to a high voltage at high voltage DC bus 205. The voltage is maintained by charge storage 204 to minimize impact of loading. Buck converter 206 converts the high voltage to a current at AC output 207. Integrated circuit 210 contains monitoring system 211, communications system 212 and control system 213. Monitoring system 211 detects voltage and current at DC input 202, voltage at high voltage DC bus 205 and voltage and current at AC output 207. The detected signals are converted by monitoring system 211 into a suitable format for processing by control system 213. Control system 213 generates appropriate signals to operate and control the boost converter 203 and buck converter 206. A first capability of the monitoring system 211 is to determine the required DC input 202 voltage to extract maximum power from the associated PV module. A second capability of monitoring system 211 is to detect the voltage and frequency of the signal at AC output 207 to determine if the AC output voltage and frequency are within predetermined limits of operation for the inverter. If the limits are exceeded, the buck converter 206 is disabled by the control system. A third capability of the monitoring system is to compare the phase of the AC output voltage to the AC output current at AC output 207. The phase must be maintained to cause power to flow out of the AC output 207 with a power factor substantially close to unity. A fourth capability of the monitoring system is to determine if the inverter has been disconnected or connected to the PV module or AC grid. If a disconnection occurs, the monitoring system detects the sudden change in terminal signals and sends a signal to the control system to shut down the inverter to minimize contact arcing while being disconnected. During the applications of connections, the monitoring system establishes that conditions are met for proper operation with all connections secure for a minimum time period prior to enabling the inverter to eliminate any arcs during the application of connections to the inverter. This capability is termed "hot-swap" and minimizes the difficulty in installation or replacement of an inverter. A first capability of control system 213 is to generate timing signals to cause boost converter 203 to convert the low DC input 202 voltage to the high voltage at high voltage DC bus 205. A second capability of control system 213 is to generate timing signals to cause buck converter 206 to convert the high voltage at high voltage DC bus 205 to an AC output current at AC output 207. Communications system 212 provides a means for external communications with the PV panel-mounted inverter 201 via the AC output 207 utilizing power line communications. Data to be sent to the inverter 201 is encoded via carrier signal on the AC load voltage by an external communications device and appears at AC output 207. Monitoring system 211 detects this signal and converts it from an analog signal into a digital signal suitable for processing by communications system 212. Communications system 212 maintains a local address unique to each inverter in a system and detects the existence of a message for the present inverter 201. If the message address does not match the local address, no action is taken by the communications system 212. If the message address matches the local address, then communications system 212 determines a control action depending on the message content. Control actions may include, but are not limited to, enabling or disabling the inverter, adjusting inverter performance parameters such as output voltage, current or power, changing maximum power-point tracking operating modes and initiating inverter 201 test functions. Data to be sent by inverter 201 to external devices is encoded by communications system 212 onto a carrier signal to be applied to AC output 207. The carrier could be generated in inverter 201 or it could load modulate an externally generated carrier arriving at AC output 207. Communications system 212 sends the encoded data to control system 213 to generate pulses that cause buck converter 206 to either generate a modulated carrier signal or to load modulate an external carrier signal at AC output 207. In this way, buck converter 206 is used for both generation of AC line power and carrier communications signals at AC output 207. The present invention PV module-mounted inverter 201 thus supports power line communications with external devices via AC output 207 and removes the typical requirement for an additional communications medium, such as independent wires or wireless radio frequency, to support external communications with the inverter 201. The assembly of the monitoring system 211, communications system 212 and control system 213 into integrated circuit 210 results in a total component count for the present invention PV module-mounted inverter 201 of between 20 and 80 components. This is significantly less than that for the prior art PV module-mounted inverter 101 and leads to a significant reduction of present invention PV module-mounted inverter 201 cost and a tremendous improvement in reliability. Reliability is further enhanced since a custom integrated circuit 210 can be designed to achieve a lifetime of 25 years that well exceeds the lifetime of 10 years for typical off-the-shelf commercial integrated circuits. The integrated circuit 210 may also include active and passive components of boost converter 203 and buck converter 206. Integrated circuit 210 may also be implemented as multiple integrated circuits. Charge storage 204 is normally implemented as a capacitor, but may also be implemented as flux storage by utilizing an inductor and changing DC bus 205 to a current mode of operation. A person skilled in the art can also combine the functions of the boost converter, charge storage and buck converter via circuit manipulations. Monitoring system inputs can be voltages, currents, voltages that are representative of circuit voltages and currents or currents that are representative of circuit voltages and currents. The various signals in the inverter can be implemented as analog, sampled analog or digital signals. Digital signals can be implemented in parallel word form or serial bit-stream form.

Figure 3:
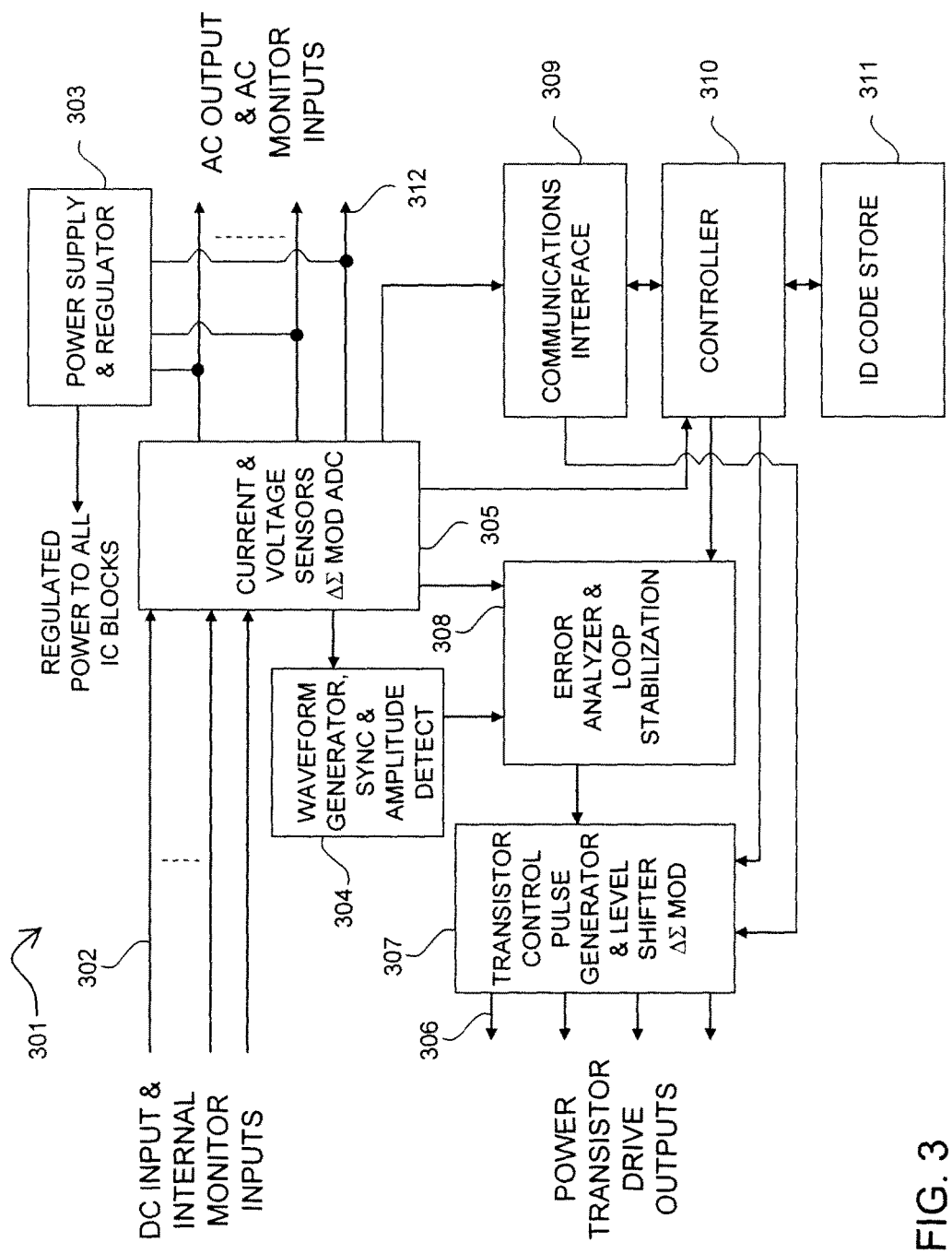
FIG. 3 is a block diagram of the present invention PV inverter integrated circuit.

Referring now to FIG. 3, a PV module-mounted inverter integrated circuit block diagram 301 according to a preferred embodiment of the present invention includes a DC input and internal monitor inputs 302; power supply and regulator 303; waveform generator, sync and amplitude detect 304; current and voltage sensors and ADC 305; power transistor drive outputs 306; transistor control pulse generator, level shifter and delta-sigma modulator 307; error analyzer and loop stabilization 308; communications interface 309; controller 310; identification (ID) code store 311 and AC output and AC monitor inputs 312. Power supply and regulator 303 converts the grid voltage arriving at AC output 312 into a DC voltage to bias all of the integrated circuit 301 blocks, boost converter 203 transistor controls and buck converter 206 transistor controls via rectification and filtering. The total power utilized from the power supply and regulator 303 is very small allowing for inclusion in integrated circuit 301. Current and voltage sensors and delta-sigma modulator ADC 305 detect all input voltages appearing at DC input and internal monitor inputs 302 and output and AC monitor inputs 312 and convert them to an equivalent digital code via an ADC. This code is transmitted to other blocks to establish the operating conditions for control of the inverter 201 and to report the operating conditions via power line communications. Waveform generator, sync and amplitude detect 304 examines the AC monitor input 312 to determine the frequency, phase and amplitude of the AC grid voltage. It generates a digitally-encoded sine wave that is synchronized to the AC grid voltage with as many phases as appear at AC monitor input 312. Error analyzer and loop stabilization 308 compares the sine wave generated by the waveform generator 304 with the AC output current measured via AC monitor inputs 312 and the current sensor 305 and generates an error feedback signal. The error feedback signal is passed through a dynamic, reconfigurable feedback loop stabilization filter containing an integrator and is fed to pulse generator 307. Transistor control pulse generator, level shifter and delta-sigma modulator 307 converts the filtered digital error signal word into a pulse waveform. The pulse waveform can be a simple digitally generated PWM signal, a delta-sigma modulated fixed pulse-width signal or a PWM signal with delta-sigma dithering to achieve finer resolution than the simple digitally generated PWM alone. The generated pulse is fed to a level shifter that converts the low voltage logic signals of the internal integrated circuit logic to high voltage signals suitable to drive the boost converter 203 and buck converter 206 power processing transistor control inputs. The level shifter limits the drive voltage or current to the power processing transistors to prevent damage to those devices. Controller 310 manages the operation of integrated circuit 301 and inverter 201. Controller 310 continuously monitors the sensors and ADC 305 outputs to determine the state of the DC PV module power at the DC input 302, the grid voltage and the current into the grid at the AC output 312. If the grid voltage amplitude and frequency fall out of the allowed inverter operating range, the controller disables the output so as to avoid the grid islanding condition. If the grid voltage is within the allowed amplitude and frequency specifications, the controller checks the communications interface 309 to determine if there are any communications conditions to be applied to the inverter activity. If the communications channel is available and a signal is sent commanding the inverter to be enabled, the controller 310 will start operation of the pulse generator 30 and error analyzer and loop stabilization 308. Otherwise, these circuits are disabled and no AC output current flows from the inverter. Communications of control and status information is routed through communications interface 309. The controller 310 receives commands from and can transmit commands to the communications interface 309 to interact with external circuits via power line communications. Commands to the inverter would include, but not be limited to, enabling or disabling the inverter and requests for inverter data or initiation of an inverter self-test. Data from the inverter would include, but not be limited to, all available input and output current and voltage information, self-test results and inverter identification code number. The inverter identification code number is stored in ID Code Store 311. This is a large digital number that uniquely identifies the inverter for purposes of communications and tracking. The identification code is used during communications as an address for an external communications device to specifically select the inverter for commands and responses. The identification code is also used to track the device during manufacture, distribution and installation to assist in determination of inventory, security, failure analysis and for other related purposes. A person skilled in the art could implement the functions for integrated circuit 301 in multiple integrated circuits or as a combination of integrated circuits and discrete components. The controller 310 can be implemented using state machines, microprocessor or microcontroller techniques known in the art. The ID code store 311 may be implemented using fuses, printed circuit layout elements, programmable read-only memory, flash memory, ferroelectric memory, fuse memory or other such means of data storage as exists in the field of non-volatile electronics data storage.

Figure 4:
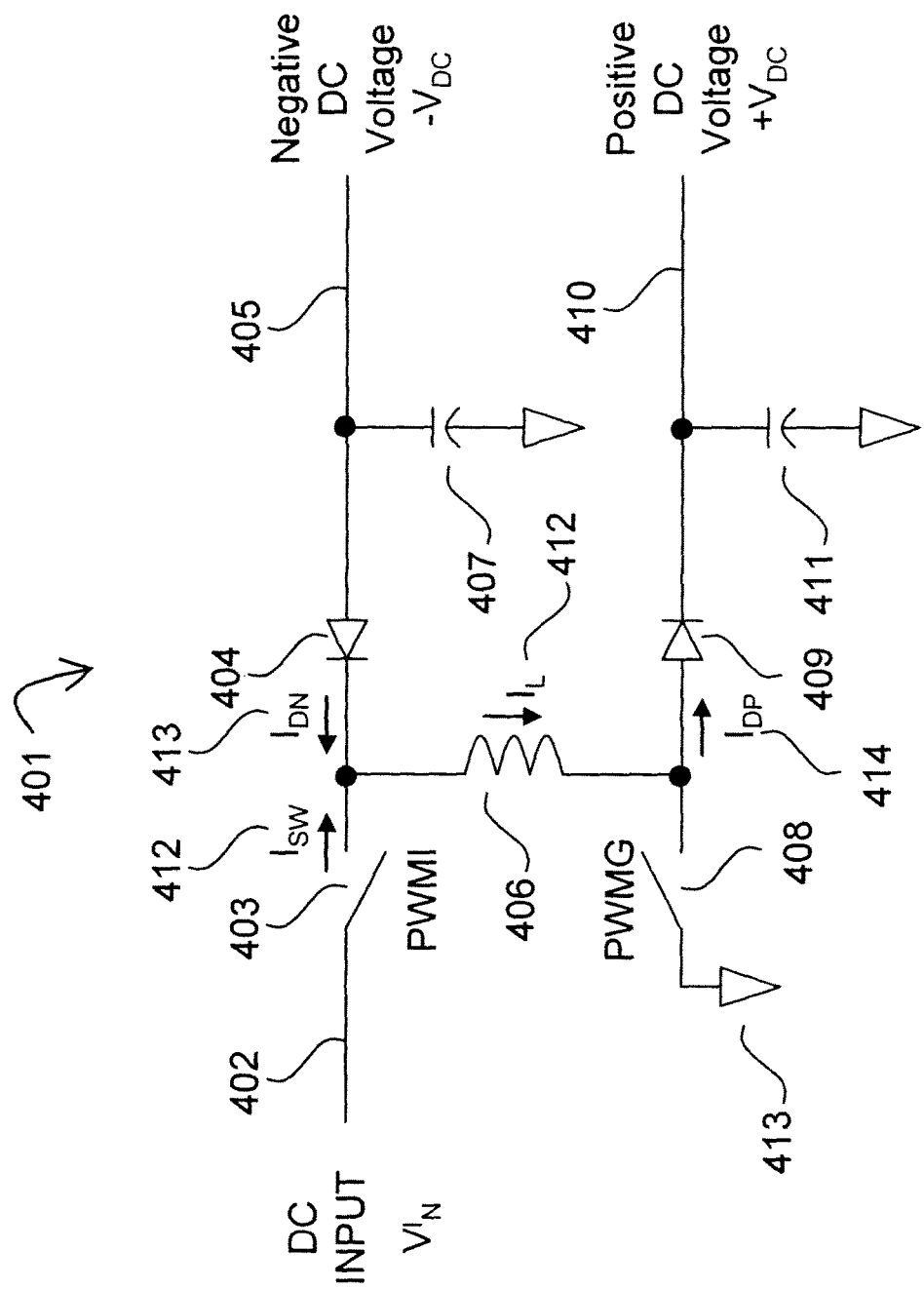
FIG. 4 is a schematic of the present invention single-inductor, bipolar-output boost converter.

Referring now to FIG. 4, a single-inductor, bipolar-output boost converter 401, according to an embodiment of the present invention, includes a DC input 402, an input switch PWMI 403, an input switch current ISW 412, a ground switch PWMG 404, a negative output diode 404, a negative output diode current 413, a negative output DC voltage 405, a negative output capacitor 407, an inductor 406, a positive output diode 409, a positive output diode current 414, a positive output DC voltage 410, a positive output capacitor 411, an inductor current IL 412 and a ground terminal 413. The switches 403 and 408 are closed in a timing sequence to implement one of two methods of generating a simultaneous positive 410 and negative 405 output voltage from a positive input voltage 402 referenced to ground 413. Closing both PWMI 403 and PWMG 408 causes a current IL to flow in inductor 406. The current rises in a linear slope during the inductor 406 charge cycle. After allowing the current to rise to a maximum value, one of the switches 403 or 408 is opened. Opening PWMG 408 causes the inductor current IL to flow into diode 409 and then into capacitor 411. The capacitor voltage is charged in a positive direction relative to ground 413. If instead switch PWMI 403 is opened, the inductor current 406 will flow through diode 404 and from capacitor 407. The capacitor voltage is charged in a negative direction relative to ground 413. In the first mode of operation, the generation of positive and negative currents is performed by charging the inductor 406 and discharging it into capacitor 411 resulting in a positive voltage at output 410. Then the inductor 406 is charged again by closing both switches 403 and 408 and it is discharged into capacitor 407 resulting in a negative voltage at output 405. The total sequence of two charge and discharge cycles of inductor 406 is repeated resulting in a continuous positive 410 and negative 405 output voltage from the boost converter. Thus this first mode is termed the two-cycle mode of operation. In the second and preferred mode of operation, inductor 406 is charged by closing both switches 403 and 408. Switch PWMI 403 is then opened resulting in current in diode 404 from capacitor 407. A short time later, switch PWMG 408 is opened and the current now flows in both diode 404 and diode 409. A positive voltage results on output 410 and a negative voltage results on output 405. This sequence repeats resulting in a continuous positive 410 and negative 405 output voltage from the boost converter. Since the inductor 406 is charged and discharged only once to create both positive and negative output voltages simultaneously, this second mode is termed the single-cycle mode of operation. Alternative input connections to the boost converter 401 can be implemented by a person skilled in the art by connecting switch PWMG 408 to a negative input source and switch PWMI 403 to ground 413 resulting in a single inductor converter utilizing a negative input voltage. First diode 404 and second diode 409 could be replaced with switches to implement a synchronous rectification for both positive 410 and negative 405. Relative timing of the switches and diode currents can be adjusted by one skilled in the art to optimize overall system efficiency without changing the basic operation of the boost converter 401.

Figure 5:
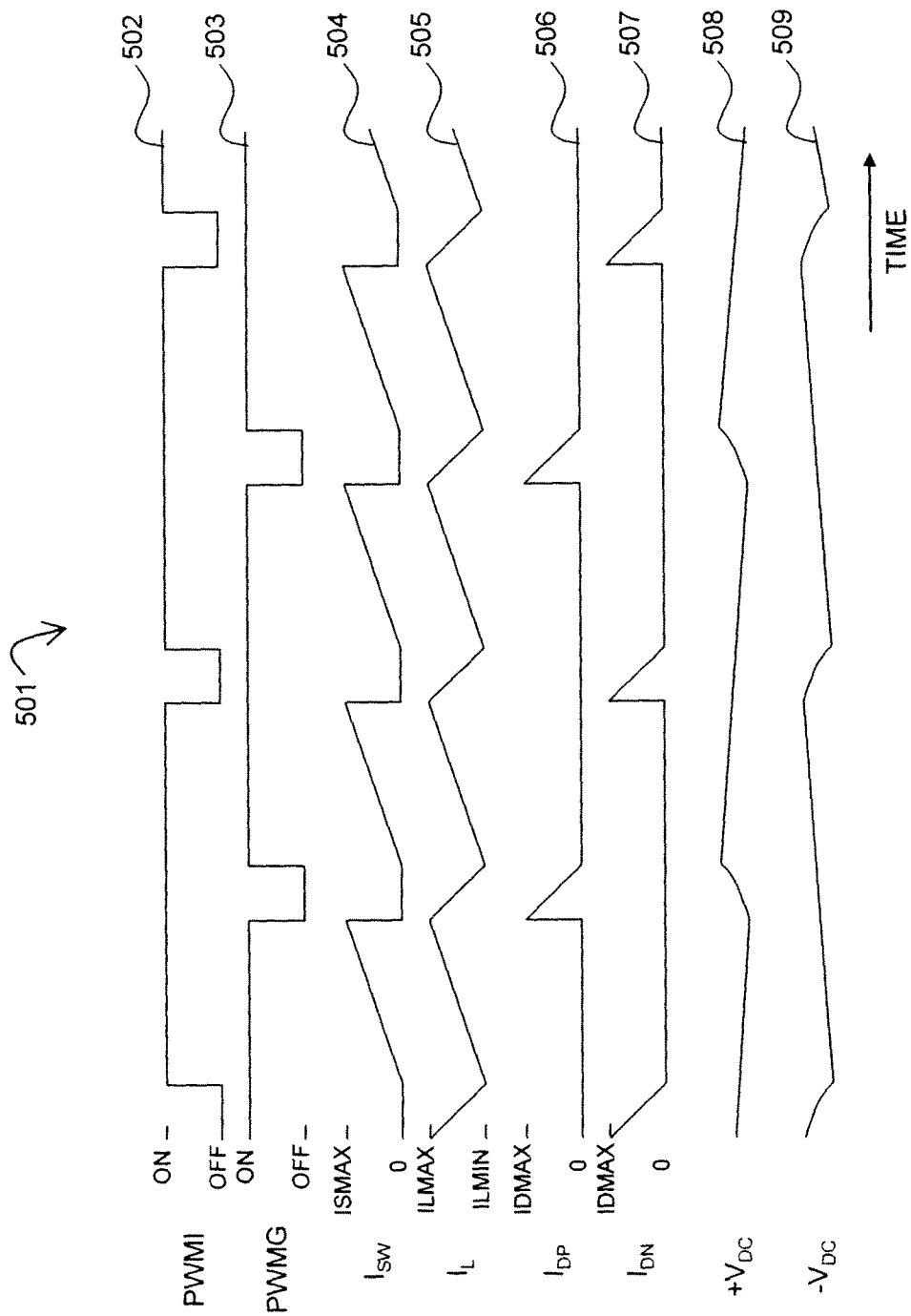
FIG. 5 is a timing diagram depicting the timing sequence of signals occurring in the present invention bipolar-output boost converter using a single inductor operating in two-cycle mode.

Referring now to FIG. 5, a timing diagram of a single-inductor, bipolar-output boost converter operating in two-cycle mode 501 according to an embodiment of the present invention includes waveforms for signals PWMI 502, PWMG 503, switch current ISW 504, inductor current IL 505, positive output diode current IDP 506, negative output diode current IDN 507, positive DC output voltage +VDC 508 and negative DC output voltage −VDC 509. The description of the signals and their relationships is given in the two-cycle mode description for FIG. 4. The timing diagram 501 shows one possible result and a person skilled in the art will recognize that the relative timing and signal level scales can be adjusted over a large range with no change in fundamental circuit behavior. The inductor 406 of the boost converter 401 could operate in continuous mode as shown by trace 505. A person skilled in the art will recognize that the inductor 406 of the boost converter 401 can also operate in discontinuous mode as defined in the literature.

Figure 6:
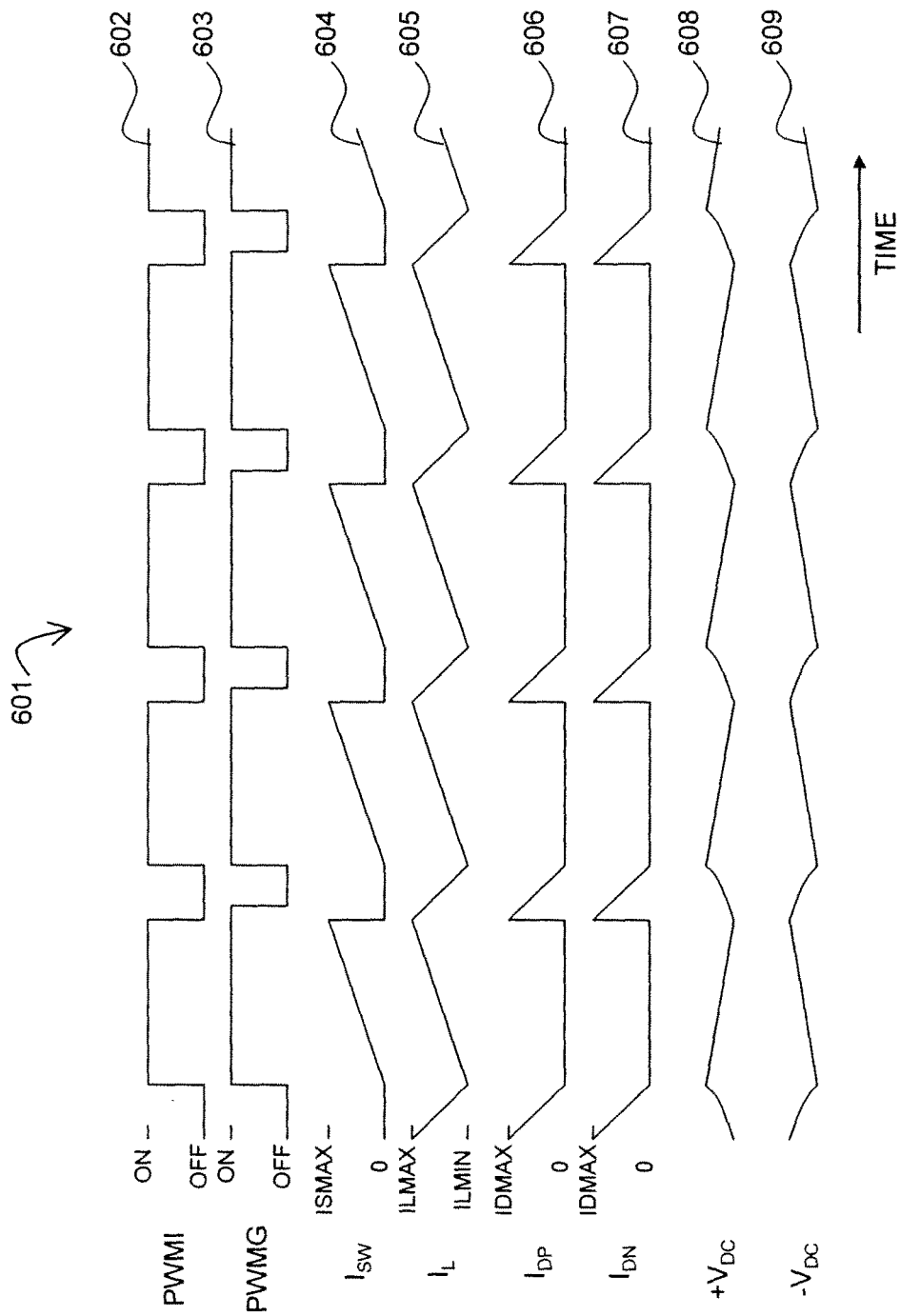
FIG. 6 is a timing diagram depicting the timing sequence of signals occurring in the present invention bipolar-output boost converter using a single inductor operating in single-cycle mode.

Referring now to FIG. 6, a timing diagram of a single-inductor, bipolar-output boost converter operating in single-cycle mode 601 according to an embodiment of the present invention includes waveforms for signals PWMI 602, PWMG 603, switch current ISW 604, inductor current IL 605, positive output diode current IDP 606, negative output diode current IDN 607, positive DC output voltage +VDC 608 and negative DC output voltage −VDC 609. The description of the signals and their relationships is given in the single-cycle mode description for FIG. 4. The timing diagram 601 shows one possible result and a person skilled in the art will recognize that the relative timing and signal level scales can be adjusted over a large range with no change in fundamental circuit behavior. The inductor 406 of the boost converter 401 could operate in continuous mode as shown by trace 605. A person skilled in the art will recognize that the inductor 406 of the boost converter 401 can also operate in discontinuous mode as defined in the literature.

Figure 7:
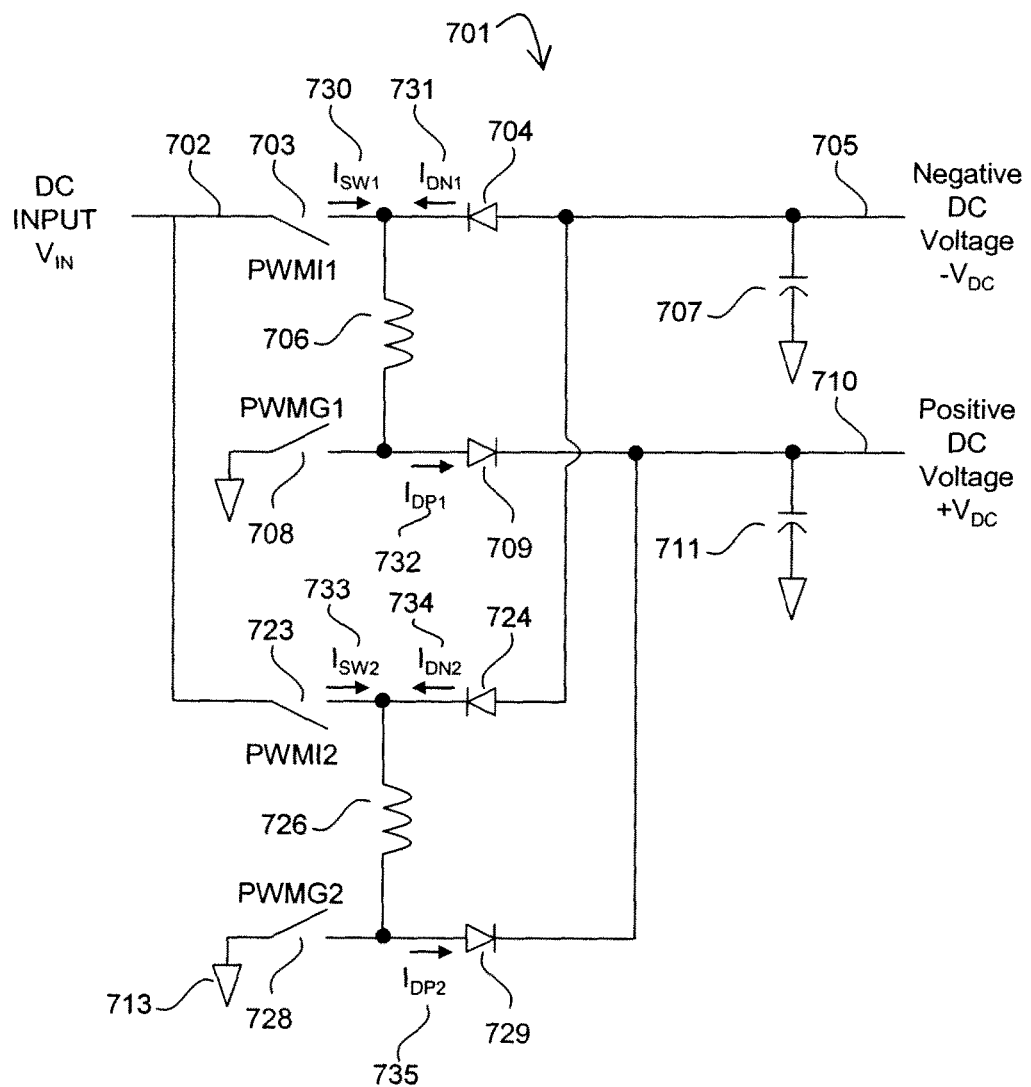
FIG. 7 is a schematic of the present invention tandem single-inductor, bipolar-output boost converter.

Referring now to FIG. 7, a tandem single-inductor, bipolar-output boost converter 701 according to a second embodiment of the present invention includes a DC input 702, a first input switch PWMI1 703, a first input switch current ISW1 730, a first ground switch PWMG1 708, a first negative output diode 704, a first negative output diode current IDN1 731, a negative output DC voltage 705, a negative output capacitor 707, an inductor 706, a first positive output diode 709, a first positive output diode current 732, a positive output DC voltage 710, a positive output capacitor 711, a second input switch PWMI2 723, a second input switch current ISW2 733, a second ground switch PWMG2 728, a second negative output diode 724, a second negative output diode current IDN2 734, a second positive output diode 729, a second positive output diode current 735 and a ground terminal 713. Components 702, 703, 704, 705, 706, 707, 708, 709, 710 and 711 comprise a first single-inductor, bipolar-output boost converter. Components 723, 724, 705, 726, 707, 728, 729, 710 and 711 comprise a second single-inductor, bipolar-output boost converter. Components 702, 705, 707, 710 and 711 are shared between the two converters. The preferred mode of operation is for each converter to operate in single-cycle mode as described for the single-inductor, bipolar-output boost converter. However, the timing of the switches of the second converter is delayed relative to the first by half of the single-cycle PWM period resulting in inductors 706 and 726 being charged and discharged at different times. The benefit of this mode is apparent in the plots in FIG. 8 for positive output voltage +VDC 705 or 814 and negative output voltage −VDC 710 or 815. There is a higher ripple frequency at the output, which reduces the size of the capacitor required to filter the ripple voltage present at the two outputs. A significant reduction in component current performance is also achieved. Each transistor switch, diode and inductor of the tandem boost converter 701 now carries one-half the current that would occur in an equivalent non-tandem, single-inductor, bipolar-output boost converter 401. Thus a greater range of less expensive components may be used in implementing tandem single-inductor, bipolar-output boost converter 701. Those skilled in the art will realize that the number of tandem boost converter stages shown in FIG. 7 (two) could be increased as desired to four or eight, or even beyond to a plurality of converter stages. Each would be coupled to the DC input terminal, the negative DC output terminal, and the positive DC output terminal as shown in FIG. 7. Alternative input connections to the tandem boost converter 701 can be implemented by a person skilled in the art by connecting switches PWMG1 708 and PWMG2 728 to a negative input source and switches PWMI1 703 and PWMI2 728 to ground 713 resulting in a single inductor converter utilizing a negative input voltage. The first diode 704, second diode 709, third diode 724 and fourth diode 729 could be replaced with switches to implement a synchronous rectification for both positive 710 and negative 705 outputs. Relative timing of the switches and diode currents can be adjusted by one skilled in the art to optimize overall system efficiency without changing the basic operation of the tandem boost converter 701.

Figure 8:
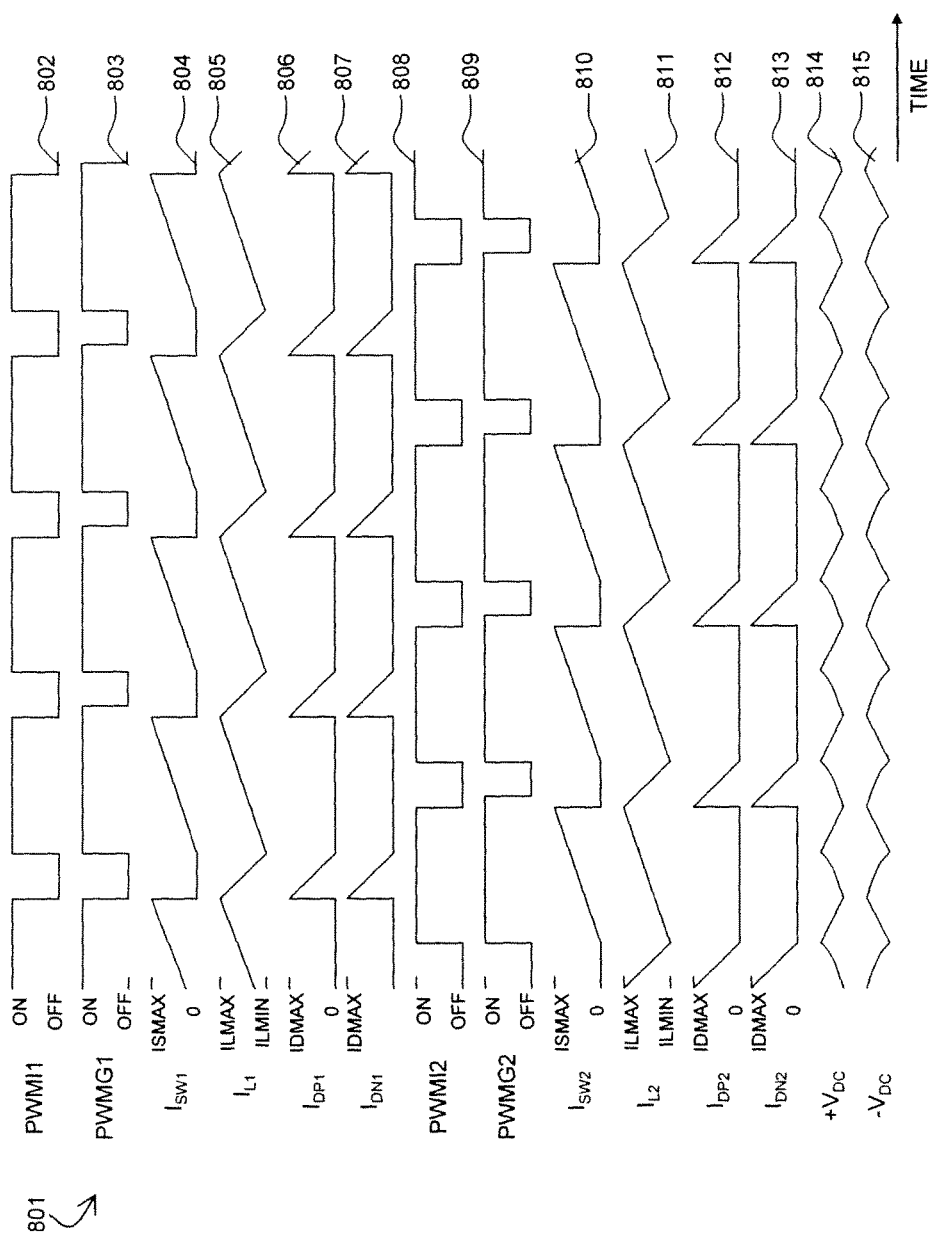
FIG. 8 is a timing diagram depicting the timing sequence of signals occurring in the present invention tandem bipolar-output boost converter using a single inductor operating in single-cycle mode.

Referring now to FIG. 8, a timing diagram of a single-inductor, bipolar-output boost converter operating in two-cycle mode 501 according to a first embodiment of the present invention includes waveforms for signals PWMI1 802, PWMG1 803, first switch current ISW1 804, first inductor current IL1 805, first positive output diode current IDP1 806, first negative output diode current IDN1 807, signals PWMI1 808, PWMG1 809, second switch current ISW1 810, second inductor current IL1 811, second positive output diode current IDP1 812, second negative output diode current IDN1 813, positive DC output voltage +VDC 814 and negative DC output voltage −VDC 815. The description of the signals and their relationships is given in the description for FIG. 7. The timing diagram 801 shows one possible result and a person skilled in the art will recognize that the relative timing and signal level scales can be adjusted over a large range with no change in fundamental circuit behavior. The first inductor 706 and the second inductor 726 of the boost converter 701 could operate in continuous mode as shown by trace 805. A person skilled in the art will recognize that the first inductor 706 and second inductor 726 of the tandem boost converter 701 can also operate in discontinuous mode as defined in the literature.

Figure 9:
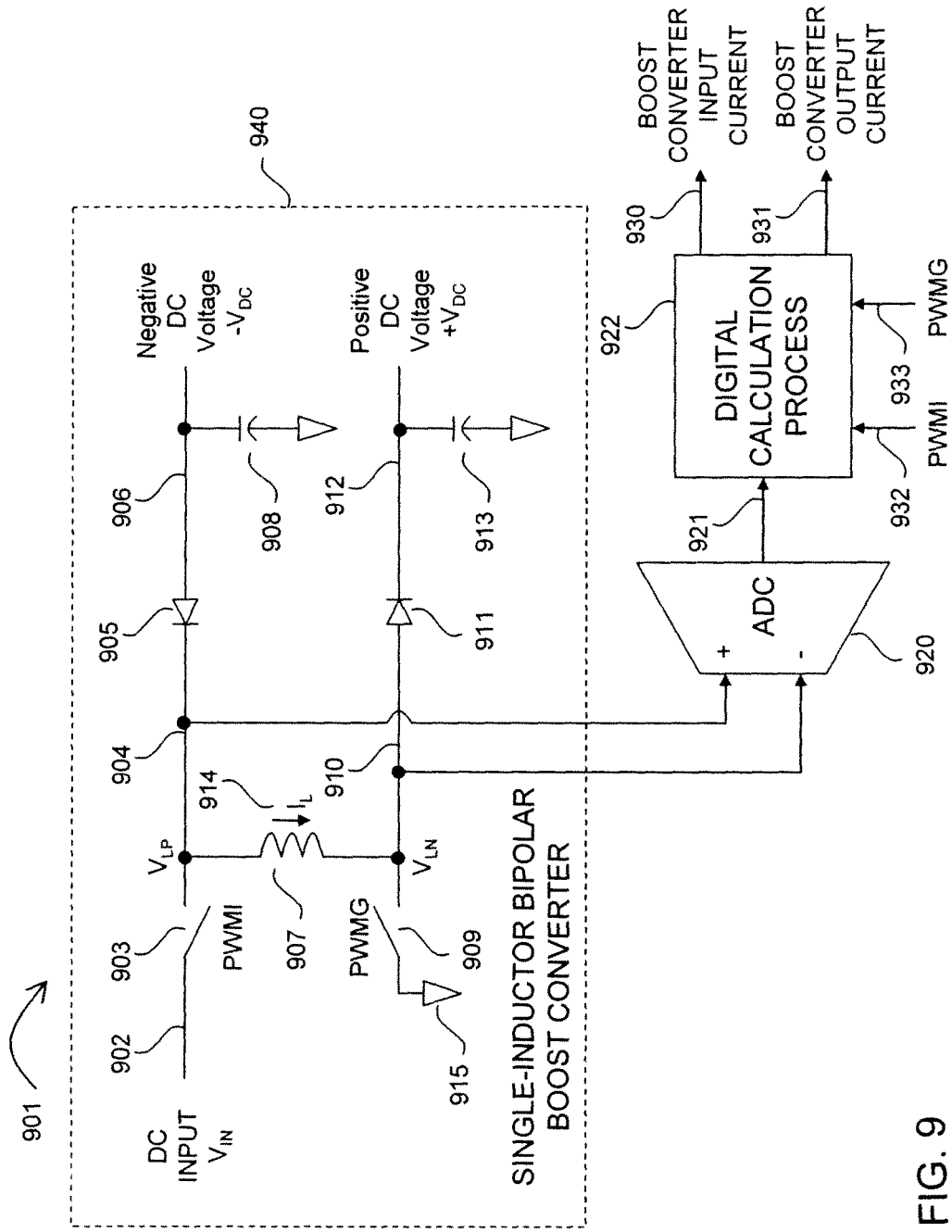
FIG. 9 is a schematic of the present invention boost converter inductor current indirect measurement system.

Referring now to FIG. 9, a boost converter inductor current indirect measurement system 901 according to a first embodiment of the present invention includes a DC input 902, an input switch PWMI 903, a ground switch PWMG 909, a negative output diode 905, a negative output DC voltage 906, a negative output capacitor 908, an inductor 907, a positive output diode 911, a positive output DC voltage 912, a positive output capacitor 913, an inductor current IL 914, an inductor positive voltage VLP 904, an inductor negative voltage VLN 910 and a ground terminal 915 all forming a single-inductor, bipolar boost converter 940, and an ADC 920, an ADC output 921, a digital calculation process 922, a switch control input PWMI 932, a switch control input PWMG 933, a calculated inductor input current 930 and a calculated inductor output current 931. The single-inductor, bipolar boost converter 940 operates in either single-cycle or two-cycle mode as previously described. ADC 920 measures and subtracts the voltages at VLP 904 and VLN 910 and converts the result into a digital code at ADC output 921. The code represents the voltage across inductor 907 at the time of ADC data conversion. Signal PWMI 932 is active when switch PWMI 903 is closed. Signal PWMG 933 is active when switch PWMG 909 is closed. Digital calculation process 922 measures the time that both PWMI 932 and PWMG 933 are simultaneously active as the charging time of inductor 907. The calculation process 922 then detects the average voltage measured by ADC 920 during the charging time. Calculation process 922 multiplies the measured inductor voltage by the charging time and divides by the known value of inductor 907. The result of this calculation is the maximum current IL 914 through inductor 907. Since the current is a sawtooth waveshape, the average current is calculated by dividing the peak inductor current IL 914 by a factor of two and then multiplying by the charging time divided by the total of the charging time and non-charging time for one cycle. The result is the inductor input current 930. The time that the inductor is not charging during one operating cycle is the non-charging time. The calculation process 922 then detects the average voltage measured by ADC 920 during the non-charging time. Calculation process 922 multiplies the measured inductor voltage by the non-charging time and divides by the known value of inductor 907. The result of this calculation is the maximum current IL 914 through inductor 907. Since the current is a sawtooth waveshape, the average current is calculated by dividing the peak inductor current IL 914 by a factor of two and then multiplying by the non-charging time divided by the total of the charging time and non-charging time for one cycle. The result is the inductor output current 931. There are many methods by which the ADC and digital calculation process may be implemented. A person skilled in the art will recognize that some or all of the processing defined for the ADC 920 and digital calculation process 922 may be implemented via analog signals, sampled analog signals or digital signals and any combination thereof. The ADC output signal 921 can be a parallel digital word a digital bit-stream or a series of sampled analog voltages or currents.

Figure 10:
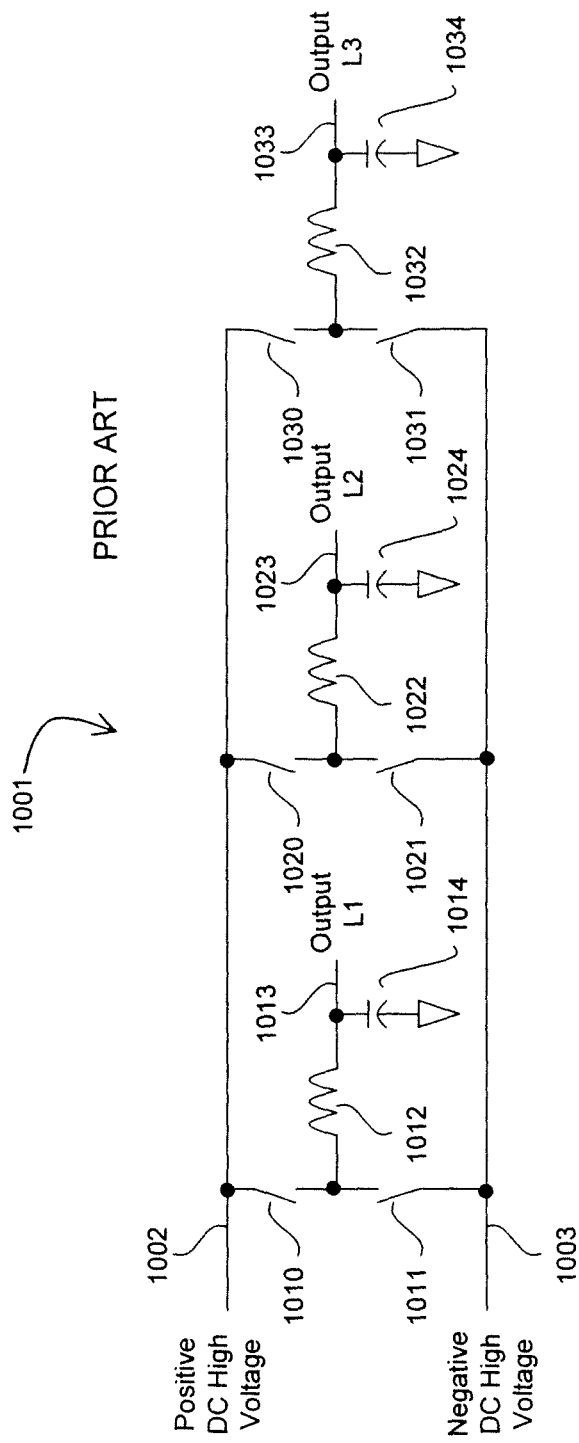
FIG. 10 is a schematic of a prior art multi-phase output buck converter.

Referring now to FIG. 10, a multi-phase output buck converter 1001, according to the prior art, includes a positive DC high voltage input 1002, a negative DC high voltage input 1003, a first positive switch 1010, a first negative switch 1011, a first inductor 1012, a first capacitor 1014, an output L1 1013, a second positive switch 1020, a second negative switch 1021, a second inductor 1022, a second capacitor 1024, an output L2 1023, a third positive switch 1030, a third negative switch 1031, a third inductor 1032, a third capacitor 1034 and an output L3 1033. The positive DC high voltage input 1002, negative DC high voltage input 1003, first positive switch 1010, first negative switch 1011, first inductor 1012, first capacitor 1014 and output L1 1013 comprise a single buck converter according to the prior art. The circuitry associated with the other two outputs L2 1023 and L3 1033 are two similar buck converters according to the prior art. The three converters operate with switch timing such that the resulting waveforms on L1 1013, L2 1023 and L3 1033 are at different phases in relation to each other. Inductors 1012, 1022 and 1032 and capacitors 1014, 1024 and 1034 are used to perform filtering on the switching waveforms generated by switches 1010, 1011, 1020, 1021, 1030 and 1031. The currents in the inductors will be a combination of a short-term average, or DC, and high frequency effects.

Figure 11:
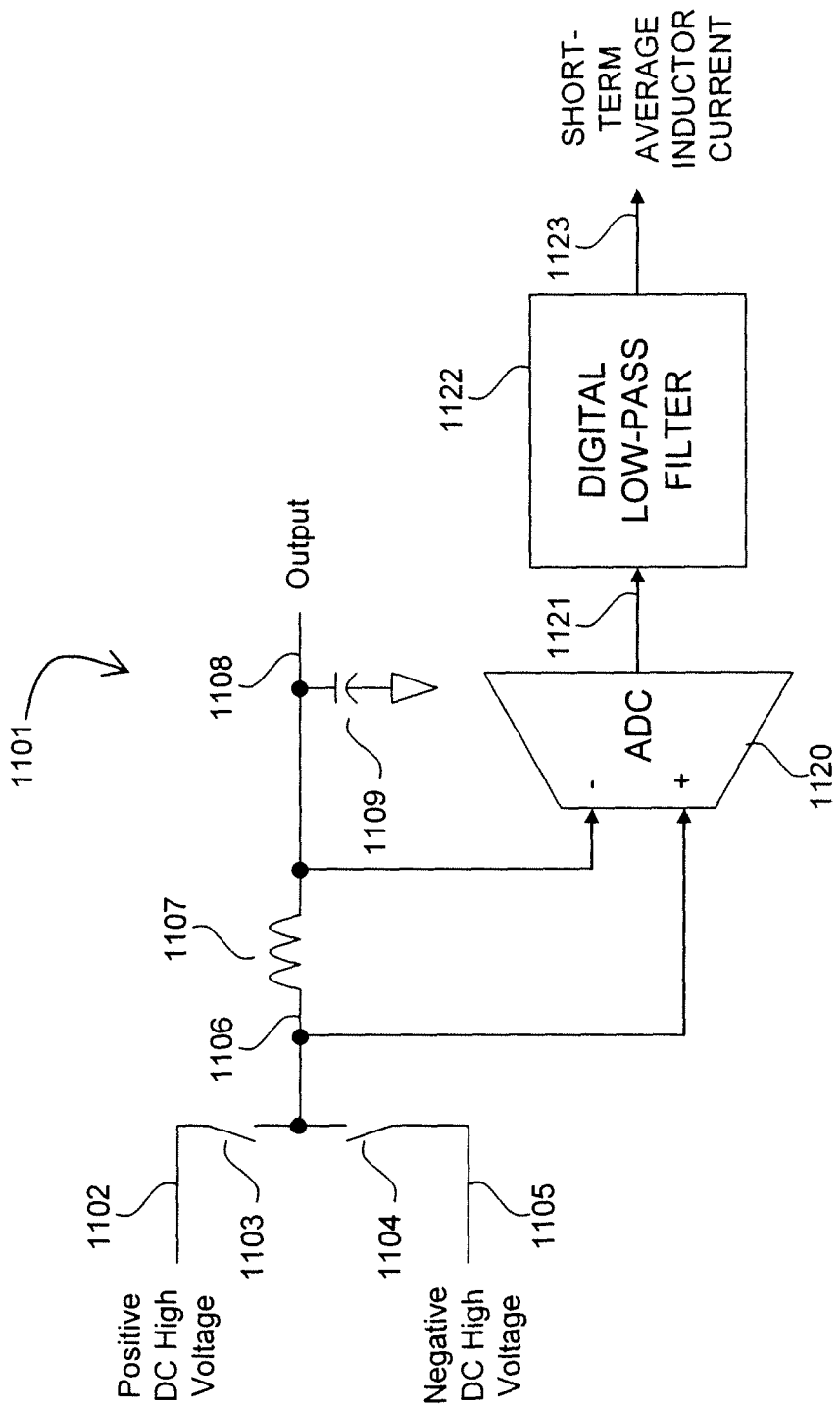
FIG. 11 is a schematic of the present invention buck converter inductor current measurement system.

Referring now to FIG. 11, a buck converter inductor current measurement system 1101 according to a first embodiment of the present invention includes a positive DC high voltage input 1102, a negative DC high voltage input 1105, a positive switch 1103, a negative switch 1104, an inductor 1107, a capacitor 1109, an output 1108, an inductor input voltage 1106, an ADC 1120, an ADC output 1121, a digital low-pass filter 1122 and a measured short-term average inductor current output 1123. Positive DC high voltage input 1102, negative DC high voltage input 1105, positive switch 1103, negative switch 1104, inductor 1107, capacitor 1109, output 1108, and inductor input voltage 1106 comprise a single buck converter stage that can be used as part of a multi-phase output buck converter. ADC 1120 continuously measures the voltage across inductor 1107 by subtracting the measured voltages at inductor input 1106 and the output 1108. The ADC converts the inductor 1107 voltage to an equivalent digital signal at ADC output 1121. The digital low-pass filter 1122 removes high frequency switching effects resulting in a short-term average at its output 1123. The output is a representation of the short-term average voltage across the inductor 1107. The output can be divided by the known DC resistance of the inductor 1107 to calculate current through inductor 1107. A person skilled in the art will recognize that some or all of the processing defined for the ADC 1120 and digital calculation process 1122 may be implemented via analog signals, sampled analog signals or digital signals and any combination thereof. The ADC output signal 1121 can be a parallel digital word a digital bit-stream or a series of sampled analog voltages or currents.

Figure 12:
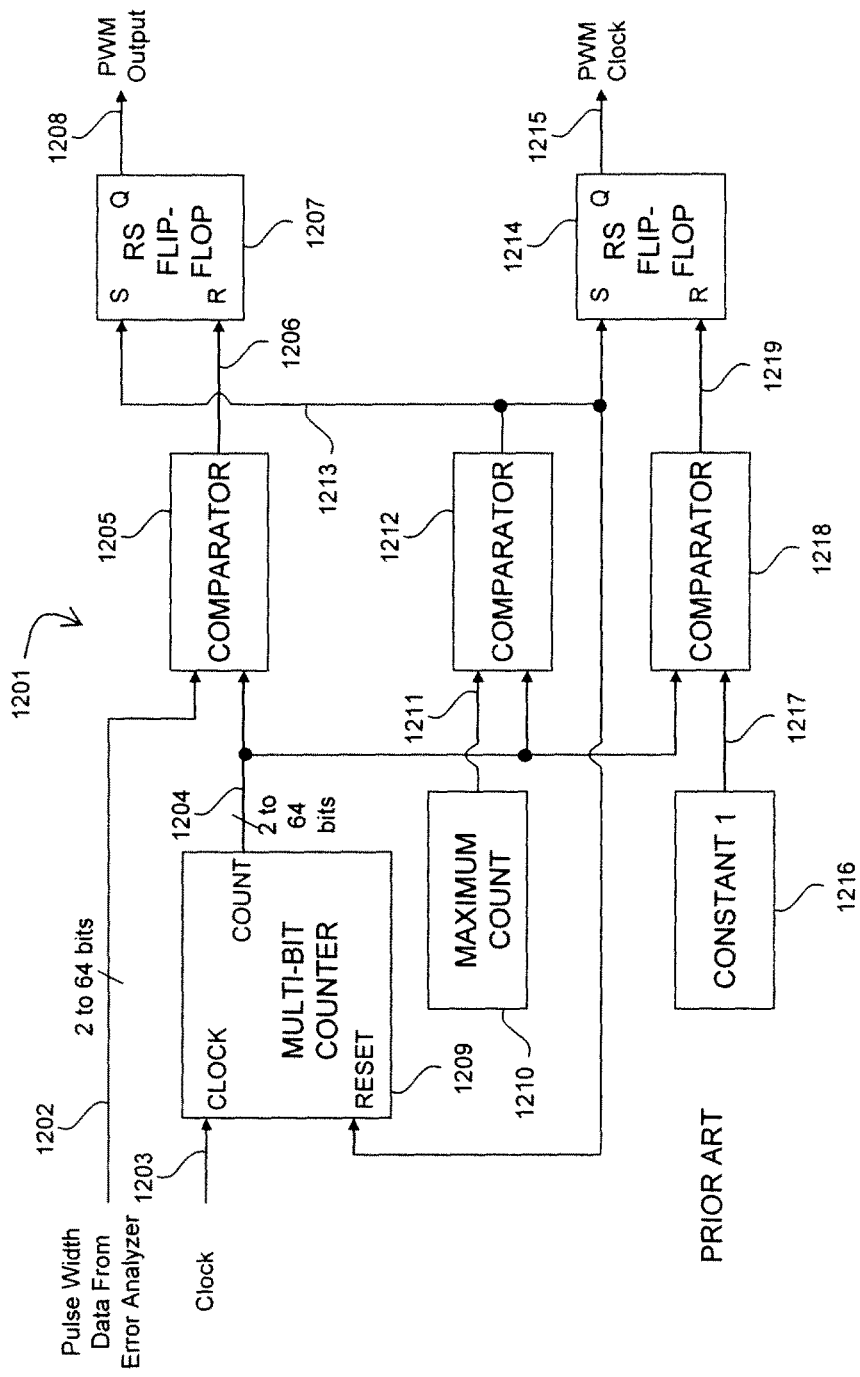
FIG. 12 is a block diagram of a prior art digital pulse-width modulator.

Referring now to FIG. 12, a digital pulse-width modulation generator 1201, according to the prior art, includes a pulse width data input 1202, a clock input 1203 a multi-bit counter 1209, a counter output 1204, three data comparators 1205, 1212 and 1218, three data comparator outputs 1206, 1213 and 1219, two RS flip-flops 1207 and 1214, a data constant of one 1216, a data constant of one output 1217, a maximum count constant 1210, a maximum count output 1211, a PWM output 1208 and a PWM clock output 1215. Assuming that the multi-bit counter 1209 and RS flip-flops 1207 and 1214 have been reset, the initial state of the system is that counter output 1204 is at zero, PWM output 1208 is asserted and PWM clock output is asserted. Applying a continuous stream of clock pulses at clock input 1203 results in the counter output to increment by a value of one on each clock pulse. This process continues until data comparator 1205 detects that counter output 1204 is equal to the pulse width data input 1202 and the comparator output 1206 is asserted resulting in a reset of RS flip-flop 1207 and a corresponding de-assertion of PWM output 1208. Thus the width of the asserted pulse at PWM output 1208 is defined by the value of the pulse width data input multiplied by the period of the signal at clock input 1203. Counter 1209 continues incrementing its output 1204 until comparator 1212 detects that counter output 1204 is equal to the maximum count value on maximum count constant output 1211 and asserts comparator 1212 output 1213 resulting in a reset of counter 1209 and a set of RS flip-flops 1207 and 1214. At this point, PWM output 1208 and PWM clock output 1215 are asserted. The counting cycle then repeats. Whenever the counter output 1204 equals the constant one 1216 via constant one output 1217, comparator 1218 asserts its output 1219 and resets RS flip-flop 1214 resulting in a de-assertion of PWM clock output 1215. Thus the PWM clock output 1215 is asserted for one input clock cycle. PWM clock output 1215 is used as a handshake signal to request an updated value of pulse width data 1202 from its associated drive circuitry. The total period of both PWM output 1208 and PWM clock output 1215 is equal to the maximum count constant 1210 times the period of the signal at clock input 1203. The PWM output 1208 pulse width has a minimum assertion time of zero and a maximum assertion time of the PWM output 1208 period. The resolution of the width of the PWM output 1208 is limited to the period of the signal at clock input 1203. In practical situations, this resolution is insufficient to meet the needs of low-distortion PWM generated waveforms and can only be improved by increasing the clock input 1203 frequency, maximum count constant 1210 value and multi-bit counter 1209 number of bits resulting in an increase in circuit dimensions, power consumption and overall accuracy requirements. There exist many different methods of implementing the digital pulse-width modulator in the prior art that have essentially the same input and output terminal characteristics utilizing digital circuitry.

Figure 13:
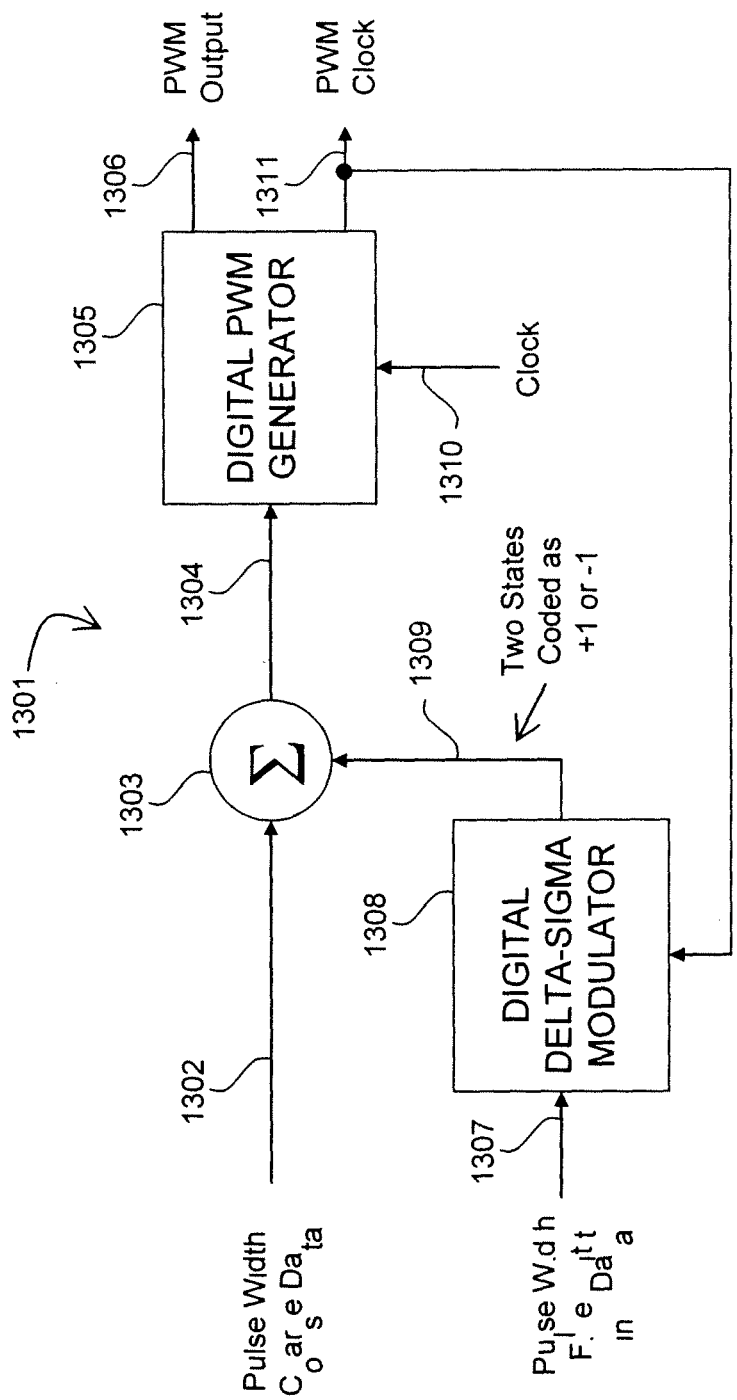
FIG. 13 is a block diagram of a pulse-width modulator utilizing sigma-delta modulation to simulate fine resolution adjustment of the pulse width.

Referring now to FIG. 13, a delta-sigma pulse-width modulator 1301, according to an embodiment of the present invention, includes a pulse width coarse data input 1302, a pulse width fine data input 1307, a digital summer 1303, a digital summer output 1304, a digital delta-sigma modulator 1308, a digital delta-sigma modulator output 1309, a digital pulse-width modulator 1305, a clock input 1310 and a PWM output 1306. The digital PWM generator 1305 operates as described for the prior art. The digital delta-sigma modulator 1308 may take on many forms and has been fully described in the prior art. Pulse width coarse data 1302 is added in summer 1303 to delta-sigma modulator output 1309 resulting in summer output 1304. Summer output 1304 is the pulse width data input into digital PWM generator 1305 and defines the resulting pulse width at PWM output 1306. Pulse width fine data input 1307 is a multi-bit representation of a fine resolution setting for the overall delta-sigma pulse-width modulator 1301. Pulse width fine data input 1307 drives delta-sigma modulator 1308 causing its output 1309 on each PWM clock 1311 cycle to be either positive one (+1) or negative one (−1). This results in the digital PWM generator data input 1304 to be incremented or decremented by one with a resulting PWM output 1306 pulse width to be incremented or decremented by one input clock 1310 cycle relative to the value at the pulse width coarse data input 1302. The delta-sigma modulator output 1309 is encoded using pulse density modulation in which the average output is calculated as the number of times in each state multiplied by the associated state value, then added together and divided by the total number of PWM clock 1311 cycles examined. The encoding also has the property of spectral shaping that improves low-frequency resolution via high frequency dithering of the delta-sigma modulator output 1309, a well-known property of delta-sigma modulation. The result of applying the method of PWM generation shown in this figure is to achieve a significant equivalent improvement in PWM output resolution without utilizing a higher frequency clock input 1310 to the digital PWM generator 1305 or increasing the PWM clock 1311 output frequency. A person skilled in the art will recognize that there are many possible implementations of the delta-sigma modulator 1308 as defined in the literature. The pulse width fine data could also be defined as an analog voltage or current signal whereby the delta-sigma modulator 1308 would be implemented to perform analog-to-digital conversion. The entire process defined by the delta-sigma pulse with modulator 1301 could be implemented using analog signals, sampled analog signals, digital signals or combinations of analog signals, sampled analog signals and digital signals. The pulse width coarse data input 1302 and pulse width fine data input 1307 could be combined to form a single pulse width input. The delta-sigma modulator can also be replaced by other modulator types to implement other spectral shaping and resolution adjustment functions. The summer 1303 may be implemented as an analog adder or could be implemented as part of the delta-sigma modulator 1308. The signal 1309 may include more than two states depending on the type of delta-sigma modulator 1038 implementation.

Having described and illustrated the principle of the invention in a preferred embodiment thereof, it is appreciated by those having skill in the art that the invention can be modified in arrangement and detail without departing from such principles. Although a preferred method and circuit has been shown, the exact details of the preferred method and circuit can be changed as desired as required for a particular application. For example, the partitioning of the described integrated circuit can include or exclude functions shown to reduce power consumption and cost. All signaling inside of the various circuit blocks or between the various circuit blocks could be implemented in analog, sampled analog or digital domains. The input boost converter, charge storage and output buck converter could be combined into a single function by circuit reduction techniques. We therefore claim all modifications and variations coming within the spirit and scope of the following claims.

I claim:

1. An inverter for use in a photovoltaic module comprising:
   a DC input terminal for receiving a DC input;
   an AC output terminal for providing an AC output generated from the DC input; and
   a communications system for receiving and sending information, using power line communications, via a modulated carrier signal superimposed on an AC voltage of the AC output at the AC output terminal.

2. The inverter of claim 1 wherein the inverter further comprises:
- a monitoring system for monitoring at least the voltage on the DC input terminal and the AC output terminal;
- a power section coupled between the DC input terminal and the AC output terminal; and
- a control system coupled between the monitoring system and the power section.

3. The inverter of claim 1, wherein communications signals for sending the information via the AC output terminal are generated using a pulse-width modulation (PWM) system.

4. The inverter of claim 2 wherein the communications system, the monitoring system, and the control system are implemented in one or more integrated circuits.

5. The inverter of claim 4 wherein the one or more integrated circuits comprise at least one active or passive component from the power section.

6. The inverter of claim 2 wherein the power section comprises a boost converter.

7. The inverter of claim 6 further comprising circuitry for measuring inductor terminal voltages in the boost converter, processing the terminals' voltages, and calculating an inductor current by dividing the processed terminal voltages by a predetermined inductance value.

8. The inverter of claim 2 wherein the power section comprises a buck converter.

9. The inverter of claim 8 further comprising circuitry for measuring inductor terminal voltages in the buck converter, processing the terminal voltages, and calculating an inductor current by dividing by the processed terminal voltages by a predetermined inductor DC resistance value.

10. The inverter of claim 2 wherein the power section further comprises a delta-sigma modulation circuit.

11. The inverter of claim 10 wherein the power section further comprises a PWM generator circuit.

12. The inverter of claim 1 further comprising a hot-swap capability.

13. The inverter of claim 12 wherein the hot-swap capability comprises circuitry for detecting disconnect conditions in at least one of the terminals and shutting down currents to the at least one terminal.

14. The inverter of claim 12 wherein the hot-swap capability comprises circuitry for testing at least one of the terminals for proper connectivity prior to enabling currents to the at least one terminal.

15. The inverter of claim 1, further comprising:
- a single-inductor, bipolar-output boost converter comprising:
  - a boost converter DC input terminal;
  - a negative DC output terminal;
  - a positive DC output terminal;
  - a single inductor having a first node and a second node;
  - a first switch coupled between the boost converter DC input terminal and the first node of the inductor;
  - a second switch coupled between ground and the second node of the inductor;
  - a first diode having an anode coupled to the negative DC output terminal and a cathode coupled to the first node of the inductor;
  - a second diode having an anode coupled to the second node of the inductor and a cathode coupled to the positive DC output terminal;
  - a first capacitor coupled to the negative DC output terminal; and
  - a second capacitor coupled to the positive DC output terminal.

16. The inverter of claim 15 further comprising a single-cycle operating mode.

17. The inverter of claim 15 further comprising a two-cycle operating mode.

18. The inverter of claim 1, further comprising:
- a tandem bipolar-output boost converter comprising:
  - a boost converter DC input terminal;
  - a negative DC output terminal;
  - a positive DC output terminal;
  - a first boost converter having a single inductor switched between the boost converter DC input terminal and ground, a first output coupled to the negative DC output terminal, and a second output coupled to the positive DC output terminal;
  - a second boost converter having a single inductor switched between the boost converter DC input terminal and ground, a first output coupled to the negative DC output terminal, and
  - a second output coupled to the positive DC output terminal;
  - a first capacitor coupled to the negative DC output terminal; and
  - a second capacitor coupled to the positive DC output terminal.

19. The inverter of claim 18 further comprising a single-cycle operating mode.

20. The inverter of claim 18 further comprising a plurality of boost converters.

* * * * *